(12) United States Patent
Chang et al.

(10) Patent No.: US 8,235,601 B2
(45) Date of Patent: Aug. 7, 2012

(54) OPTICAL FIBER CONNECTOR CONFIGURED WITH SEPARATED SEAT MEMBER AND LENS MEMBER

(75) Inventors: Yen-Chih Chang, Tu-Cheng (TW); Wen-Yi Hsieh, Tu-Cheng (TW); Chien-Hung Lee, Tu-Cheng (TW); Chun-Fu Lin, Tu-Cheng (TW); Chi-Nan Liao, Tu-Cheng (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/916,604

(22) Filed: Oct. 31, 2010

(65) Prior Publication Data

US 2011/0103747 A1    May 5, 2011

(30) Foreign Application Priority Data

Oct. 30, 2009    (TW) .................................. 98137041

(51) Int. Cl.
*G02B 6/36*    (2006.01)
*G02B 6/38*    (2006.01)
*G02B 6/40*    (2006.01)
*G02B 6/32*    (2006.01)

(52) U.S. Cl. ................. 385/74; 385/33; 385/76; 385/93

(58) Field of Classification Search ...................... 385/74
See application file for complete search history.

(56) References Cited

U.S. PATENT DOCUMENTS

| 4,534,616 | A | 8/1985 | Bowen et al. | |
|---|---|---|---|---|
| 5,241,612 | A * | 8/1993 | Iwama | 385/74 |
| 6,485,189 | B1 * | 11/2002 | Gilliland et al. | 385/59 |
| 6,736,550 | B1 | 5/2004 | Wang et al. | |
| 6,739,766 | B2 * | 5/2004 | Xu et al. | 385/93 |
| 2002/0064347 | A1 * | 5/2002 | Mertz et al. | 385/52 |
| 2003/0202769 | A1 * | 10/2003 | Gutierrez et al. | 385/137 |
| 2006/0067631 | A1 | 3/2006 | Wang | |
| 2006/0068629 | A1 * | 3/2006 | Nakajima | 439/378 |
| 2006/0147159 | A1 * | 7/2006 | Cheng et al. | 385/83 |
| 2009/0154884 | A1 * | 6/2009 | Chen et al. | 385/79 |

FOREIGN PATENT DOCUMENTS

| CN | 2294534 Y | 10/1998 |
|---|---|---|
| FR | 2924503 A1 | 11/2007 |
| JP | 2004-184429 A | 7/2004 |

* cited by examiner

*Primary Examiner* — Michelle R Connelly
(74) *Attorney, Agent, or Firm* — Wei Te Chung; Andrew C. Cheng; Ming Chieh Chang

(57) ABSTRACT

An optical fiber connector includes a lens member integrally forming pairs of lens at a front face thereof, a seat member assembly retained on a rear face of the lens member and fiber cables. The seat member defines slim grooves aligned with the lens and the fiber cables are received and retained in the slim grooves.

16 Claims, 6 Drawing Sheets

OPTICAL FIBER CONNECTOR CONFIGURED WITH SEPARATED SEAT MEMBER AND LENS MEMBER

BACKGROUND OF THE INVENTION

1. Field of the Invention

The present invention relates to an optical fiber connector with integral lenses to refract lights.

2. Description of Related Art

As disclosed in U.S. Pat. Nos. 4,534,616 and 6,736,550, an optical fiber connector includes an insulating seat, lens member integrally formed at the front end of the seat and optical fibers retained in the seat and aligned with the optical central lenses. As known, the connector should use transparent material to arrive light guiding as a whole, which will limit the adapted material of the connector sometimes.

SUMMARY OF THE INVENTION

An object of the present invention is to provide a lower cost optical fiber connector.

In order to achieve above-mentioned object, an optical fiber connector comprises a lens member integrally forming pairs of lenses at a front face thereof, a seat member assembly retained on a rear face of the lens member and fiber cables. The seat member defines slim grooves aligned with the lenses and the fiber cables are received and retained in the slim grooves. The lens member is made from light guiding material and the seat member is made from lower price material than the lens member. One of the rear face of the lens member and a front face of the seat member confronting with the rear face of the lens member defines positioning posts and the other of the rear face of the lens member and the front face of the seat member defines recesses to contain the positioning posts. The recesses each define opposite first inside face and second inside face, the first inside face is of vertical plane and the second inside face is formed by two intersected planes.

Other objects, advantages and novel features of the present invention will become more apparent from the following detailed description of the present embodiment when taken in conjunction with the accompanying drawings.

DETAILED DESCRIPTION OF THE INVENTION

Figure 1:
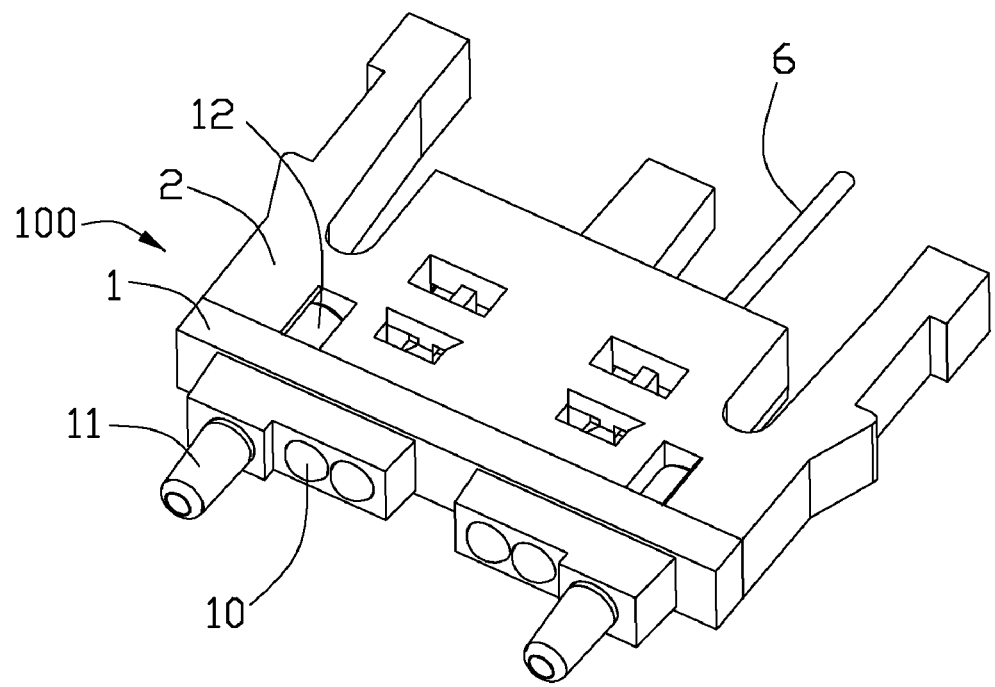
FIG. 1 is a front perspective view of an optical fiber connector of a first embodiment in accordance with the present invention.
Figure 2:
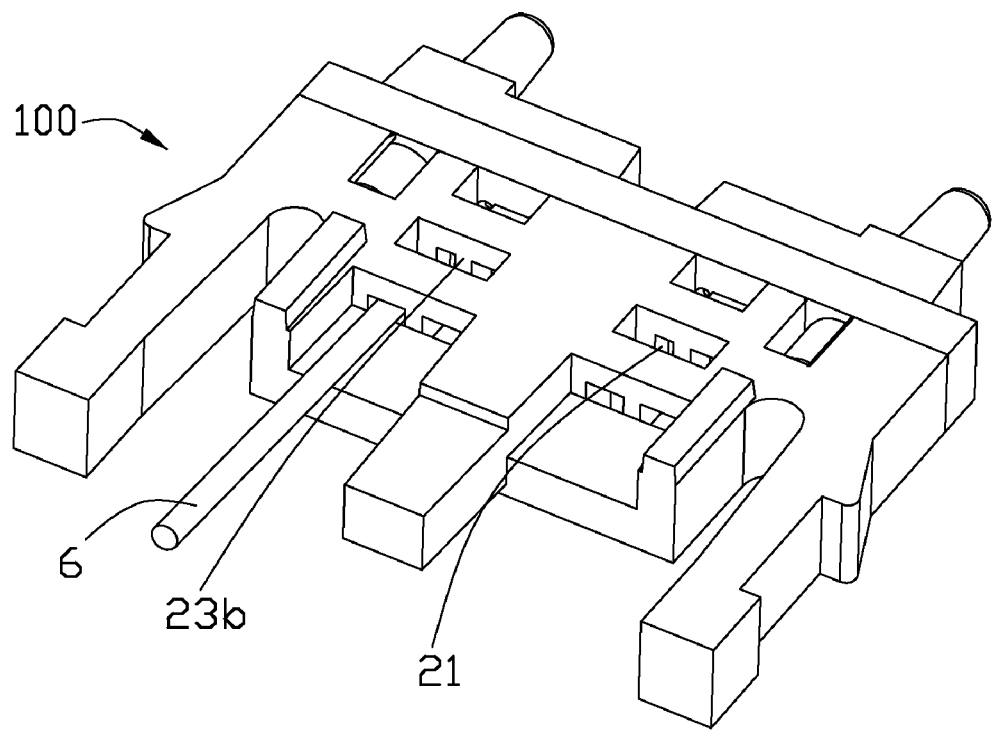
FIG. 2 is a rear perspective view of the optical fiber connector in FIG. 1.
Figure 3:
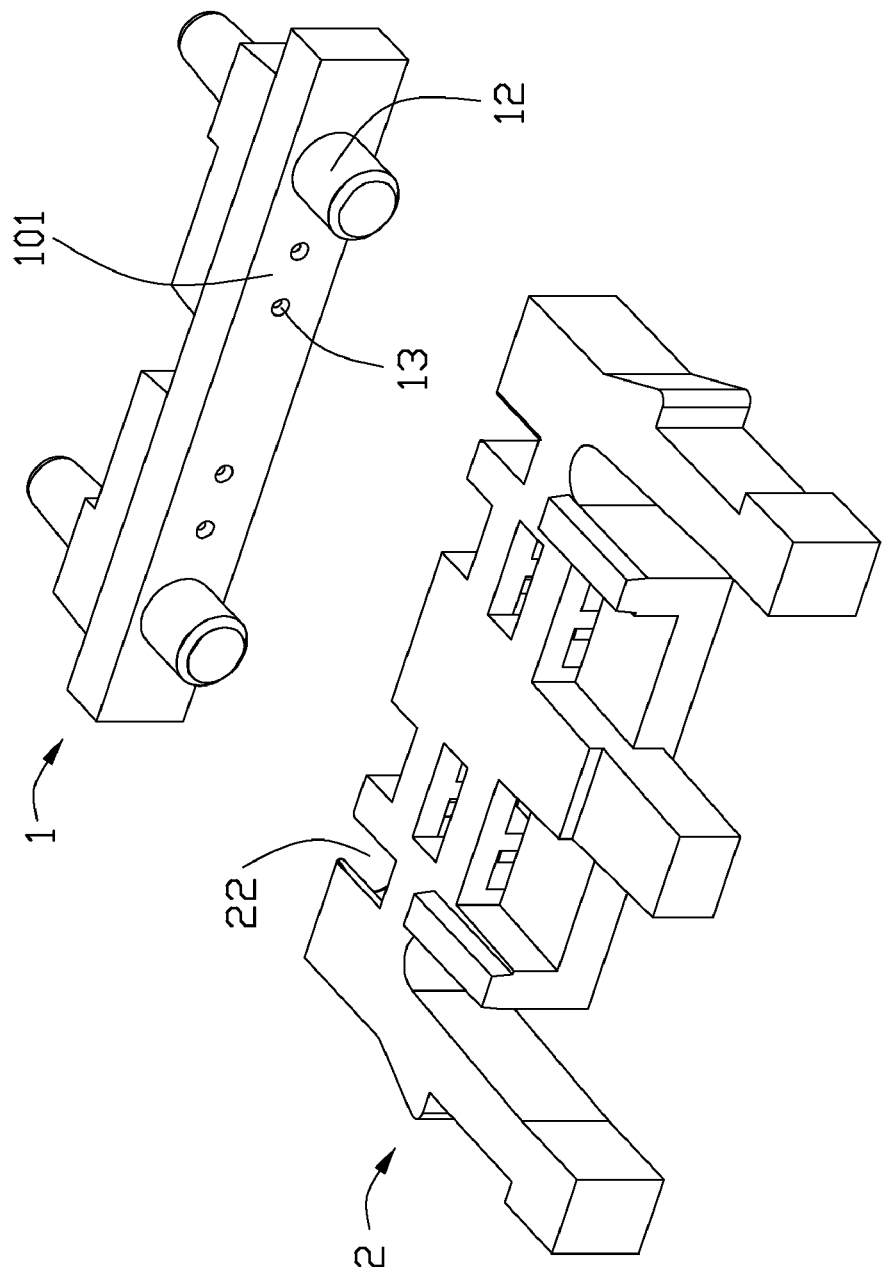
FIG. 3 is a rear exploded perspective view of the optical fiber connector in FIG. 1.
Figure 4:
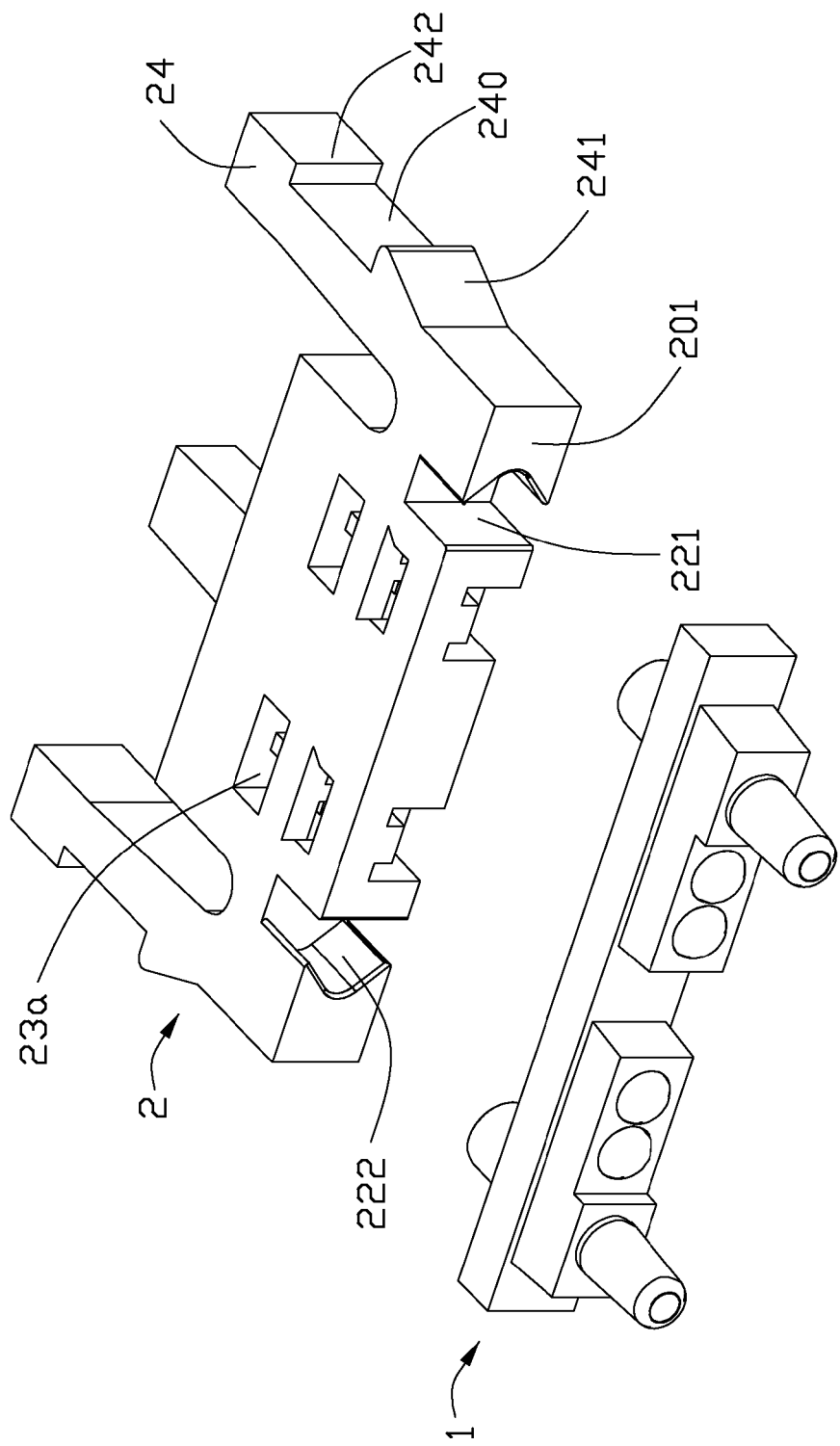
FIG. 4 is a front exploded perspective view of the optical fiber connector in FIG. 1.

Reference will now be made to the drawing figures to describe the preferred embodiment of the present invention in detail.

Referring to FIGS. 1~4 showing an optical fiber connector 100 of a first embodiment, the optical fiber connector 100 includes a lens member 1 which is made from light guiding material and a seat member 2 made from injection mould plastic which can be transparent materials or not. The lens member 1 includes two pairs of truncated non-spherical lenses 10 from a front face thereof and two guiding posts 11 at outer sides of the pairs of the lenses 10. A rear face 101 of the lens member 1 is of plane and defines two pairs of positioning posts 12 aligned with the guiding posts 11 and two pairs of slots 13 between the positioning posts 12 and aligned with the two pairs of the lenses 10.

The seat member 2, which may be used to be received in a cavity of a housing of a hybrid type connector as shown in U.S. Pat. No. 7,794,284, is made from lower price plastics such as PLP, which has a plane front face 201 to confront with the rear face 101 of the lens member 1. The seat member defines two positioning recesses 22 at the front face 201 thereof, which open through the top, bottom and front faces thereof. One inside face 221 is of vertical plane and the other inside face 222 opposite to said one inside face is formed by two intersected planes.

The lens member 1 is retained in front of the seat member 2 by the positioning posts 12 being inserted in the recesses 22. The positioning posts 12 can interfere with, or glue stick with the recesses 22. Alternatively, the positioning posts are designed to on the seat member and the recesses on the lens member. Since the lens member 1 and the seat member 2 are separately formed, the lens member and the seat member have more change to select a lower price material to low cost of the connector. Especially the seat member applies a lower price material than the lens member. Furthermore, it is more easy to control manufacturing tolerance of the lens 10.

The seat member 2 defines slim grooves 21 running through the rear face thereof which are aligned with the slots 13 to accommodate two pairs of fiber cables 6 (only one is shown). The seat member 2 further defines passageways 23a, 23b running through the top and bottom face thereof, which are used to shape the slim grooves 21 by two molds. A pair of latching arms 24 is defined at two sides of the seat member 2. The latching arms 24 extend slantwise rearwards from the seat member and space from the seat member 1 at a rear position. The latching arm 24 defines two locking portions 241, 242 at an outer side face 240 thereof. The first latching portion 241 is spacedly located in front of the second latching portion 242. The latching arms 24 are used to latch the optical fiber connector in an electrical connector (not shown), such USB 3.0 connector.

Figure 5:
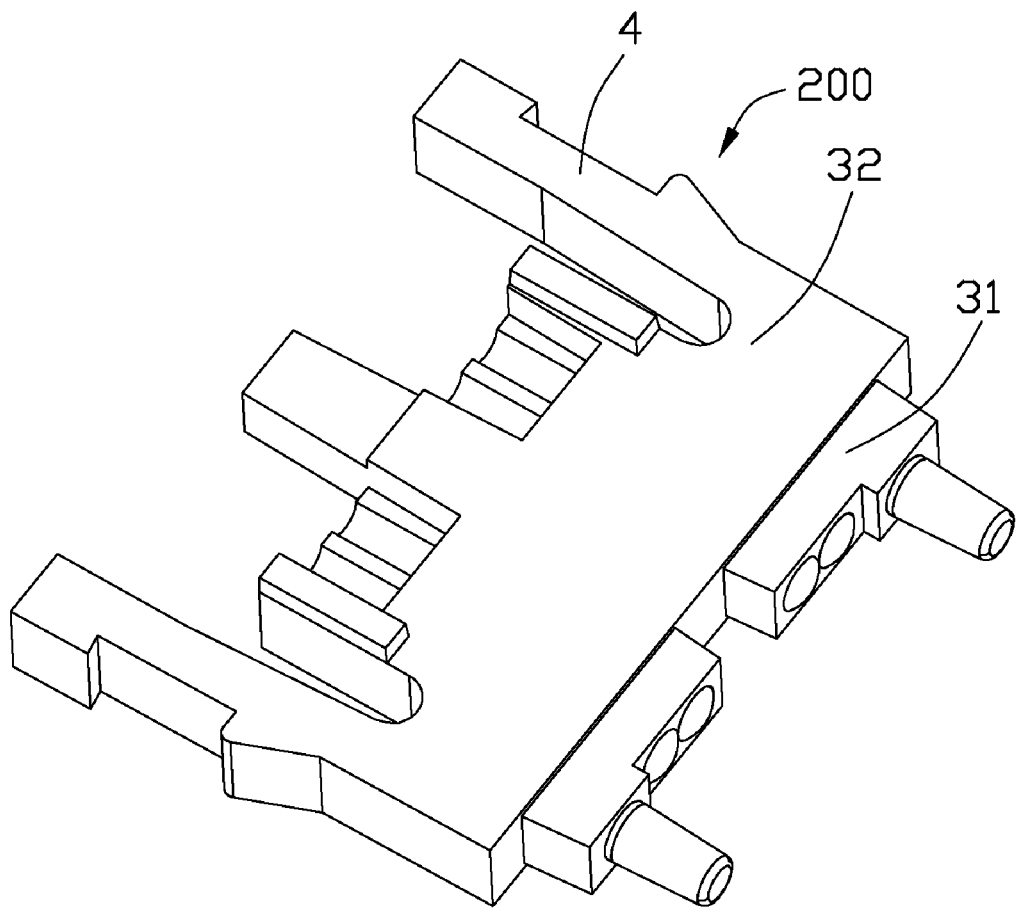
FIG. 5 is a front perspective view of an optical fiber connector of a second embodiment.
Figure 6:
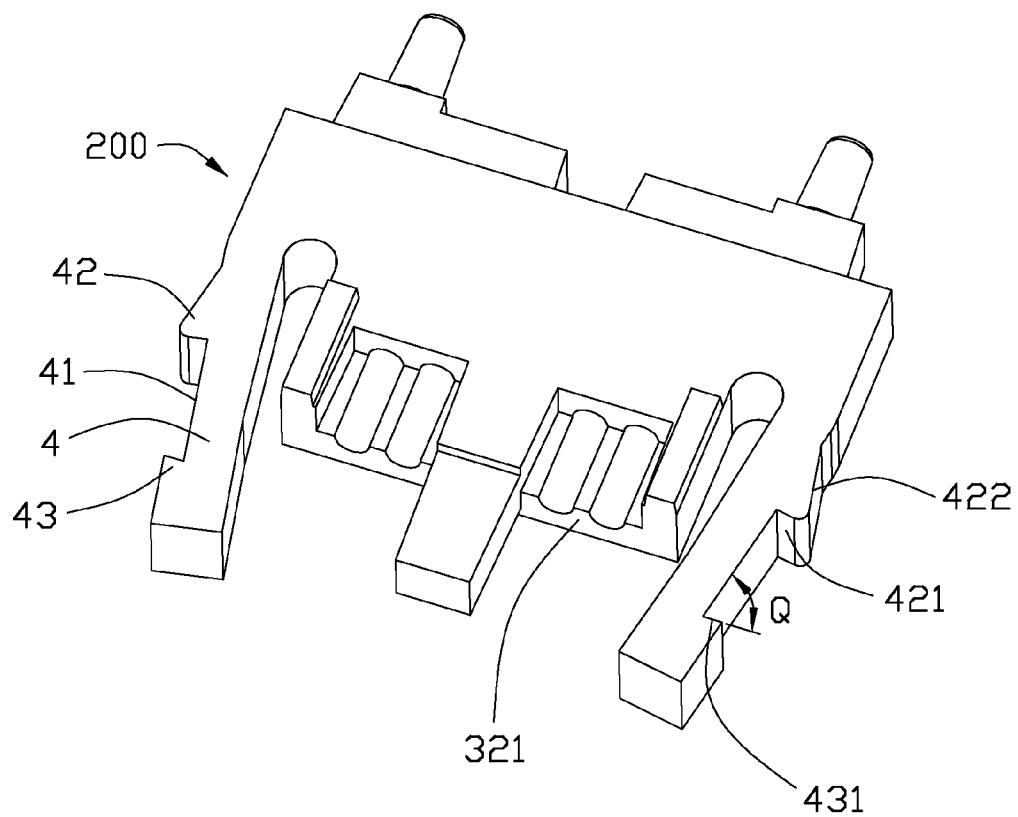
FIG. 6 is a rear perspective view of the optical fiber connector in FIG. 5.

Referring to FIGS. 5 and 6 showing an optical fiber connector 200 of a second embodiment of the present invention, the optical fiber connector 200 has a seat member 32 and a lens member 31 integrally formed together. The connector also can be formed by separate seat member and lens member as the first embodiment. The seat member 2 defines a pair of latching arms 4 extending rearward from outer sides thereof. The latching arms 4 exceed the rear face of the seat member 32. The latching arms each define two locking portions 42, 43 at an outer side face 41 thereof, the first locking portion 42 being in front of the second locking portion 43. The first locking portion 42 defines a front guiding face 422 and a rear locking face 421. The second locking portion 43 defines a front locking face 431, an angle Q between the second locking face 431 and the outer side face 41 is less than 90 degree to avoid the optical fiber connector taken off an electrical connector the optic fiber connector is embedded.

However, the disclosure is illustrative only, changes may be made in detail, especially in matter of shape, size, and arrangement of parts within the principles of the invention. Understandably, the seat member and the lens member can be assembled with each other via other methods, e.g. gluing, adhering, clamping and second molding, etc.

What is claimed is:

1. An optical fiber connector comprising:
    a lens member integrally forming pairs of lenses at a front face thereof;
    a seat member assembly retained on a rear face of the lens member, the seat member defining slim grooves aligned with the lens;
    fiber cables received and retained in the slim grooves;
    wherein the lens member is made from light guiding material and the seat member is made from lower price material than the lens member;
    wherein one of the rear face of the lens member and a front face of the seat member confronting with the rear face of the lens member defines positioning posts and the other of the rear face of the lens member and the front face of the seat member defines recesses to contain the positioning posts; and
    wherein the recesses each define opposite first inside face and second inside face, the first inside face is of vertical plane and the second inside face is formed by two intersected planes.

2. The optical fiber connector as described in claim 1, wherein the first inside faces of the recesses is disposed near the lens in relative to the second inside faces.

3. The optical fiber connector as described in claim 1, wherein the front face of the lens member defines a pair of guiding posts at two opposite sides of lenses respectively, the guiding posts project forwards beyond lenses.

4. The optical fiber connector as described in claim 1, wherein the seat member defines a pair of latching arms at two sides thereof and the latching arms extends rearwards beyond a rear face of the seat member.

5. The optical fiber connector as described in claim 4, wherein the latching arms each define a first locking portion projecting outward from an outer side face of the latching arm, the first locking arms has a rearward-facing locking face with an angle less than 90 degree between the outer side face of the latching arm.

6. An optical fiber connector comprising:
    a lens member unitarily equipped with a pair of lenses and corresponding fiber slots;
    a seat member discrete from the lens member, located behind and assembled to the lens member without relative movement therebetween;
    a pair of slim grooves formed in the seat member in alignment with the corresponding slots, respectively; and
    a pair of optical fibers extending, from a rear side, through both the slim grooves and the corresponding slots to join the corresponding lenses, respectively; wherein
    said seat member is equipped with latching structures thereon to be received in a housing while the lens member is equipped without latch structures thereon.

7. The optical fiber connector as claimed in claim 6, wherein the seat member is made by material which is cheaper than that of the lens member.

8. The optical fiber connector as claimed in claim 7, wherein said seat member is longer than the lens member in a front-to-back direction.

9. The optical fiber connector as claimed in claim 6, wherein both said slots and said slim grooves are circumferentially surrounded by the corresponding lens member and the seat member without radial exposure to an exterior.

10. The optical fiber connector as claimed in claim 6, wherein said lens member is equipped with at least one guiding post on a front face thereof for coupling to another optical fiber connector.

11. The optical fiber connector as claimed in claim 6, wherein the latching structures include a pair of cantilevered resilient latching arms, each of the resilient latching arms being equipped with a front locking portion adjacent to a root and a rear locking portion relative farther from the root.

12. The optical fiber connector as claimed in claim 11, wherein the front locking portion defines a front guiding face and a rear locking face.

13. The optical fiber connector as claimed in claim 12, wherein the rear locking portion defines a front locking face and an outer side face with therebetween an angle smaller than ninety degrees.

14. The optical fiber connector as claimed in claim 6, wherein the lens member includes a forwardly extending guiding post for coupling to a mating optical connector, and a rearwardly extending positioning post for assembling to a corresponding positioning recess in the seat member.

15. The optical fiber connector as claimed in claim 14, wherein the positioning recess provides three planes to engage the corresponding positioning post.

16. The optical fiber connector as claimed in claim 15, wherein one of said three planes is vertical while the other two are obliquely intersect each other.

* * * * *